US008981692B2

(12) United States Patent
Simili

(10) Patent No.: US 8,981,692 B2
(45) Date of Patent: Mar. 17, 2015

(54) TORQUE RIPPLE REDUCTION OF MULTIPLE HARMONIC COMPONENTS

(75) Inventor: Dwarakanath V. Simili, Hermosa Beach, CA (US)

(73) Assignee: GM Global Technology Operations LLC, Detroit, MI (US)

(*) Notice: Subject to any disclaimer, the term of this patent is extended or adjusted under 35 U.S.C. 154(b) by 162 days.

(21) Appl. No.: 13/552,983

(22) Filed: Jul. 19, 2012

(65) Prior Publication Data

US 2014/0021894 A1  Jan. 23, 2014

(51) Int. Cl.
*H02K 29/06* (2006.01)
*H02P 6/10* (2006.01)

(52) U.S. Cl.
CPC .................................. *H02P 6/10* (2013.01)
USPC ............. 318/400.23; 318/400.01; 318/400.02

(58) Field of Classification Search
USPC ............ 318/400.01, 400.02, 400.07, 400.12, 318/400.15, 400.17, 710, 721, 400.23
See application file for complete search history.

(56) References Cited

U.S. PATENT DOCUMENTS

| | | | | |
|---|---|---|---|---|
| 6,727,675 | B2 * | 4/2004 | Yoshimoto et al. | 318/700 |
| 7,176,652 | B2 * | 2/2007 | Wakabayashi et al. | 318/400.02 |
| 7,357,041 | B2 * | 4/2008 | Morishita | 73/862.326 |
| 7,768,220 | B2 | 8/2010 | Schulz et al. | |
| 7,952,308 | B2 * | 5/2011 | Schulz et al. | 318/400.23 |
| 8,294,395 | B2 * | 10/2012 | Kimpara et al. | 318/400.02 |
| 8,653,771 | B2 * | 2/2014 | Santo et al. | 318/400.23 |
| 2003/0090232 | A1 * | 5/2003 | Ho | 318/801 |
| 2009/0237014 | A1 * | 9/2009 | Yamada | 318/400.02 |
| 2011/0298405 | A1 * | 12/2011 | Costanzo et al. | 318/400.23 |

* cited by examiner

*Primary Examiner* — Rina Duda
*Assistant Examiner* — Bickey Dhakal
(74) *Attorney, Agent, or Firm* — Quinn Law Group, PLLC

(57) ABSTRACT

An electric motor system includes a motor configured to produce a torque signal in response to a torque command. The torque signal has a fundamental frequency component, a first ripple harmonic and a second ripple harmonic. The first ripple harmonic is an integer multiple of the fundamental frequency component. The second ripple harmonic is an integer multiple of the first ripple harmonic. A system and method is provided to generate a ripple reduction signal in response to the torque command that simultaneously cancels the first and the second ripple harmonic in the torque signal. The second ripple harmonic may be canceled with the first ripple harmonic by being projected onto the first ripple harmonic through a transformation matrix.

15 Claims, 2 Drawing Sheets

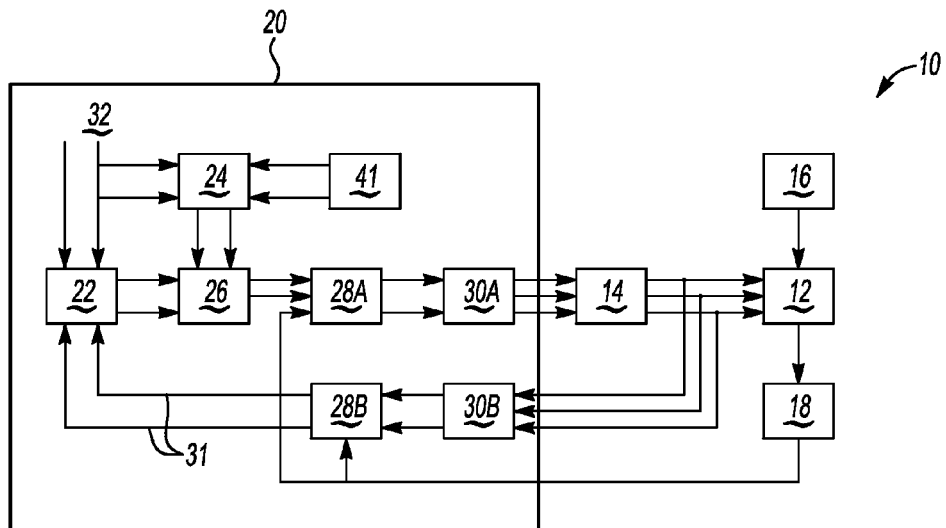
*Fig-1*
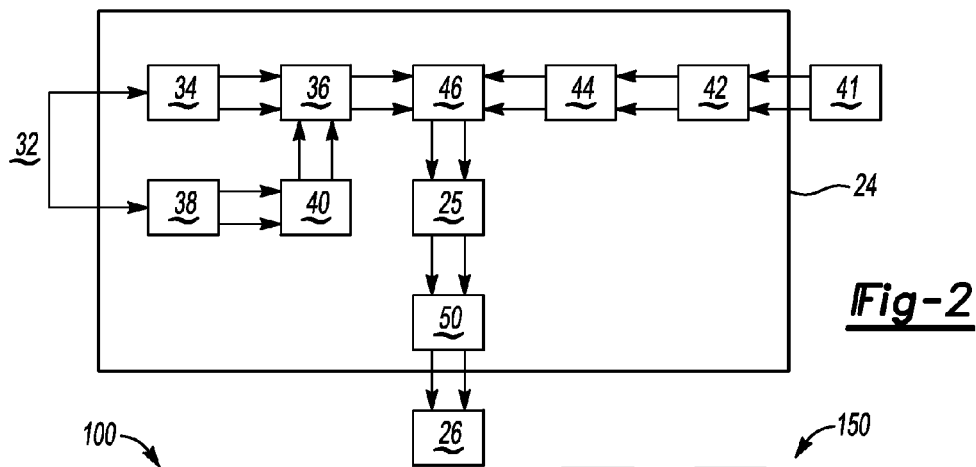
*Fig-2*
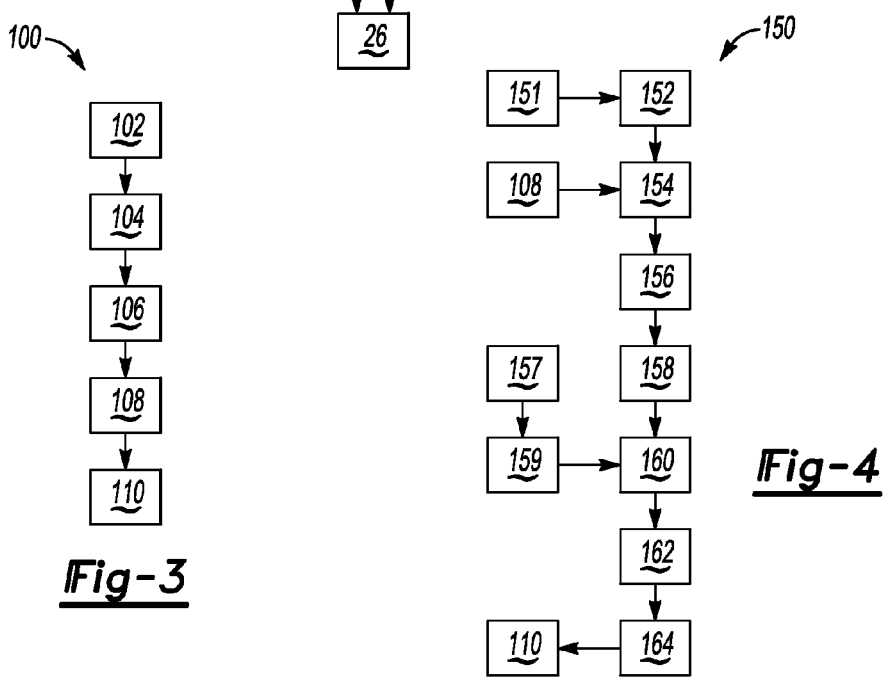
*Fig-3*
*Fig-4*

TORQUE RIPPLE REDUCTION OF MULTIPLE HARMONIC COMPONENTS

TECHNICAL FIELD

The disclosure relates generally to an electric motor system, and more particularly, to reduction of torque ripple produced in the electric motor system.

BACKGROUND

An electric motor system with an interior permanent magnet motor generally includes a rotor having a plurality of magnets of alternating polarity around the outer periphery of the rotor. The rotor is rotatable within a stator which generally includes a plurality of windings and magnetic poles of alternating polarity. The electric motor system may produce undesirable torque ripple, resulting in unwanted vibration and noise.

SUMMARY

An electric motor system includes a motor configured to produce a torque signal in response to a torque command. The torque signal has a fundamental frequency component, a first ripple harmonic and a second ripple harmonic. The first ripple harmonic is an integer multiple of the fundamental frequency component. The second ripple harmonic is an integer multiple of the first ripple harmonic. A system and method is provided for generating a ripple reduction signal that simultaneously cancels the first and second ripple harmonics in the torque signal. The second ripple harmonic may be canceled with the first ripple harmonic by being projected onto the first ripple harmonic through a transformation matrix.

A controller is operatively connected to the motor and is configured to generate a ripple reduction signal in response to the torque command. The ripple reduction signal is at least partially based on a combined cancellation command that simultaneously cancels the first and the second ripple harmonic in the torque signal. A harmonic current cancellation module in the controller is configured to generate the combined cancellation command by projecting a second cancellation command for the second ripple harmonic onto a first cancellation command for the first ripple harmonic through a transformation matrix.

The controller may include a first current regulator configured to control a fundamental current in a fundamental synchronous reference frame. The controller may include a first phase transformation block configured to transform the ripple reduction signal from a two-phase state to a three-phase state. The controller may include a reference frame transformation block configured to transform the ripple reduction signal from a fundamental synchronous reference frame to a stationary reference frame.

A method for reducing torque ripple in an electric motor system having a motor is provided. The method includes generating a torque command. A first cancellation current command is determined based on the first ripple harmonic in a first harmonic synchronous reference frame. A second cancellation current command is determined based a second ripple harmonic in a second harmonic synchronous reference frame. A combined cancellation current command (in the first harmonic synchronous reference frame) is generated by projecting the second cancellation current command onto the first cancellation current command through a transformation matrix. A ripple reduction signal is generated in response to the torque command, wherein the ripple reduction signal is at least partially based upon the combined cancellation current command and predetermined characteristics of the motor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic block diagram of an electric motor system with a controller having a harmonic current cancellation module; and FIG. 2 is a schematic block diagram of the harmonic current cancellation module of FIG. 1;

FIG. 3 is a flowchart of an example process implemented by the controller of FIG. 1 to obtain a combined cancellation current command for generating a ripple reduction signal;

FIG. 4 is a flowchart of another example process implemented by the controller of FIG. 1 to generate the ripple reduction signal based at least partially on the combined cancellation current command;

DETAILED DESCRIPTION

Figure 5:
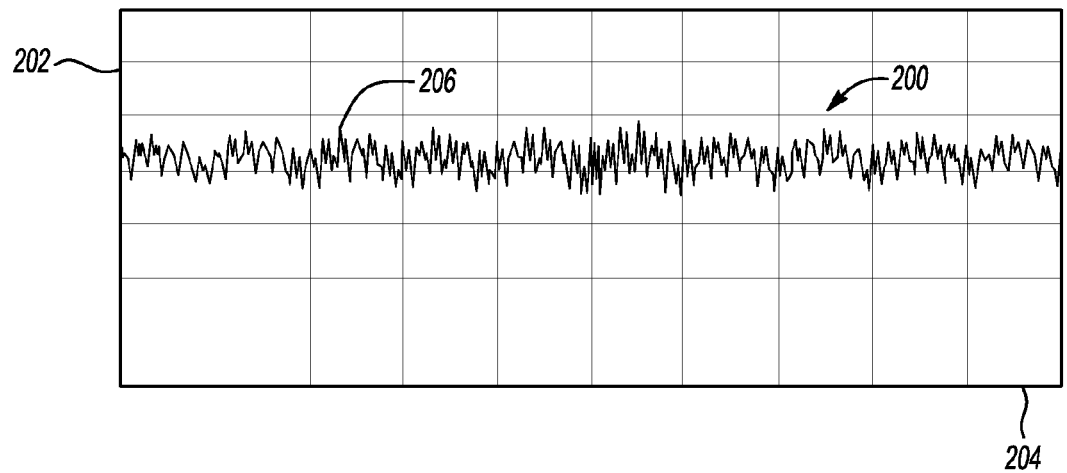
FIG. 5 is an example graph of a torque signal produced by an electric motor in response to a torque command, showing amplitude on the y-axis and time on the x-axis.

An electric motor system is provided with a controller configured to generate a ripple reduction signal in response to a torque command. The electric motor system may take many different forms and include multiple and/or alternate components and facilities. While an example electric motor system is shown in the Figures, the components illustrated in the Figures are not intended to be limiting. Indeed, additional or alternative components and/or implementations may be used.

Referring to the Figures, wherein like reference numbers refer to the same or similar components throughout the several views, FIG. 1 shows an electric motor system 10 that includes an electric motor 12, an inverter 14, an energy source 16, a resolver system 18 and a controller 20. Referring to FIG. 1, the controller 20 may include a first current regulator 22, a harmonic current cancellation module 24 (having a second current regulator 25), a voltage summation junction 26, first and second reference frame transformation blocks 28A, B, first and second phase transformation blocks 30A, B and feedback loop 31. FIG. 2 is a schematic illustration of the harmonic current cancellation module 24, described in detail below.

In an exemplary embodiment, the motor 12 is a three-phase alternating current (AC) electric machine having a rotor and stator windings. In various embodiments, the motor 12 may be an internal permanent magnet (IPM) motor, an induction motor, a synchronous reluctance motor, or another suitable motor as will be understood. Further, it should be understood that the subject matter discussed herein is not limited to three-phase machines, and may be adapted for any number of phases.

Referring to FIG. 1, the energy source 16 may provide electrical energy and/or voltage to the inverter 14 for driving the motor 12. The energy source 16 may comprise a battery, a fuel cell, an ultra-capacitor, or any other suitable energy source known in the art. The motor 12 operates in response to voltage applied to the stator windings from the inverter 14, which creates torque-producing current in the stator windings. In an exemplary embodiment, the inverter 14 provides pulse-width modulated (PWM) voltage signals to each phase of the stator windings and may comprise a plurality of transistor switch pairs (not shown) for modulating the voltage provided, as is understood in the art. The resolver system 18 (or similar speed sensing device) measures the position of the rotor and the speed of the motor 12 and provides the measured values to other components of the system 10. The resolver system 18 may include a resolver to digital converter for generating a digital representation of the rotor position. For the sake of brevity, conventional techniques related to some functional aspects of the systems (and the individual operating components of the systems) may not be described in detail herein.

Figure 6:
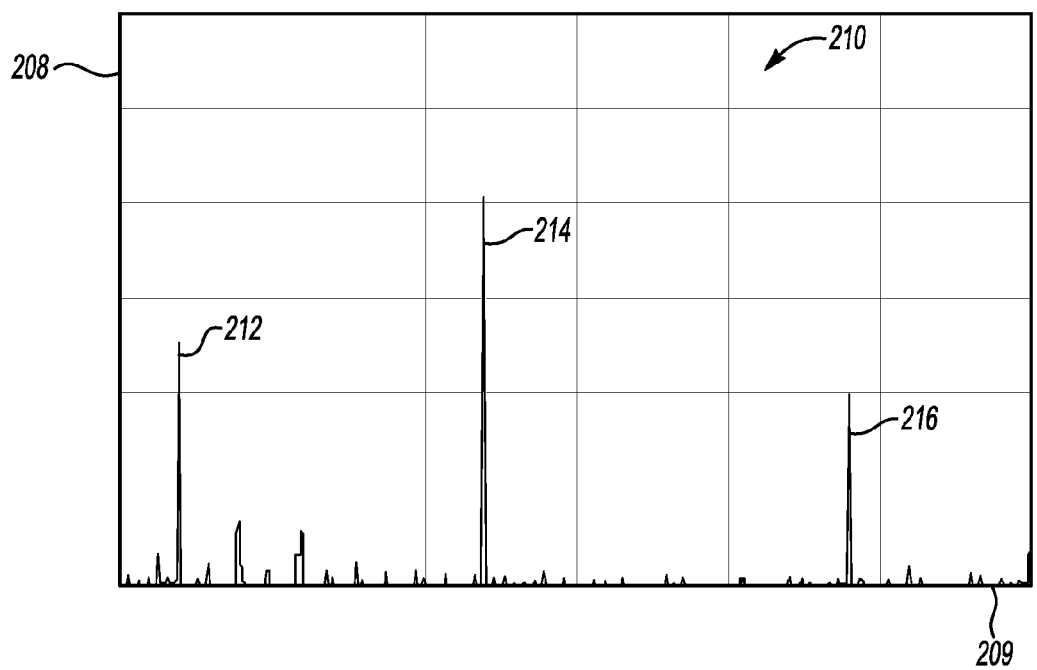
FIG. 6 is a graph of a fast Fourier transform (FFT) of the torque signal shown in FIG. 5, showing amplitude on the y-axis and frequency on the x-axis.

FIG. 5 is an example graph of a torque signal 200 produced by an electric motor 12 when a voltage/current is supplied to the motor 12 (i.e., in response to a torque command), showing amplitude on the y-axis 202 and time on the x-axis 204. Referring to FIG. 5, the torque signal 200 includes torque ripple oscillations 206. FIG. 6 is a graph of a fast Fourier transform 210 (FFT) of the torque signal 200 shown in FIG. 5, showing amplitude on the y-axis 208 and frequency on the x-axis 209. The fast Fourier transform 210 reveals that the torque ripple includes a fundamental electrical frequency component 212 ($f_0=1$) as well as higher frequency components. In the example shown, the higher frequency components include a first ripple harmonic 214 ($f_1=6$ in this case) and a second ripple harmonic 216 ($f_2=12$ in this case).

The controller 20 of FIG. 1 is configured to generate a ripple reduction signal that is configured to modify the output of the motor 12 in order to simultaneously cancel the specific torque ripple components corresponding to the first and the second ripple harmonics 214, 216. In other words, the controller 20 is configured to generate a ripple reduction signal to smooth the torque signal 200 or reduce torque ripple oscillations. The ripple reduction signal is an operational control signal that modifies the input current or input voltage to the motor 12. Controller 20 does so in part by executing a process 100 (shown in FIG. 3) which resides within the controller 20 or is otherwise readily executable by the controller 20. Process 100 need not be applied in the specific order recited herein. Furthermore, it is to be understood that some steps may be eliminated.

The techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. Controller 20 may include various sensors, computing devices and control modules, electronic control units (ECUs), or at least one processor and/or a memory which includes instructions stored thereon (or in another computer-readable medium) for carrying out the processes and methods as described below. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The controller 20 may also include sufficient transitory memory, e.g., random access memory (RAM), so that transient signals, which are not considered storage media herein, may be transmitted, received, and processed as needed in executing the process 100 of FIG. 3 (and process 150 of FIG. 4). The controller 20, whether configured as a single computer device or a distributed system, may include other components as needed, such as but not limited to high-speed clocks, timers, analog-to-digital (A/D) circuitry, digital-to-analog (D/A) circuitry, digital signal processors, and any necessary input/output (I/O) devices and/or other signal conditioning and/or buffer circuitry.

Referring to FIG. 3, process 100 may begin with step 102 where the controller 20 of FIG. 1 generates a torque command 32 in response to a user request for torque (such as a driver pressing an accelerator pedal in a vehicle). The torque command 32 is sent to the harmonic current cancellation module 24 and the first current regulator 22. As noted above, the motor 12 is configured to produce a torque signal in response to the torque command, the torque signal including a fundamental frequency component ($f_0=1$) and a plurality of ripple harmonics. The controller 20 identifies a first and a second ripple harmonic to be cancelled. The first ripple harmonic ($f_1=n$, where n is an integer) represents an integer multiple of a fundamental electrical frequency of the motor 12. In the embodiment shown, the second ripple harmonic represents an integer multiple of the first ripple harmonic ($f_2=c*n$, where c is a constant). In one embodiment, the first and second ripple harmonic represent the sixth and twelfth harmonic, or $f_1=6$ and $f_2=12$, respectively. The first and second ripple harmonics may be predetermined based on motor operating characteristics and preconfigured in the harmonic current cancellation module 24.

As noted above, the controller 20 may be embodied as one or more control blocks. As used herein, the term "block" refers to the physical hardware, circuit elements, devices, and associated software needed for executing a particular control function as described herein. As described below, the harmonic current cancellation module 24 generates harmonic cancellation commands based on the identified ripple harmonics. The harmonic current cancellation module 24 includes a first cancellation current command block 34, first junction 36, second cancellation current command block 38, transformation matrix 40, second junction 46, high pass filter 42, third reference frame transformation block 44 ($f_0$ to $f_1$) and fourth reference frame transformation block 50 ($f_1$ to $f_0$), described in detail below.

In one embodiment, the cancellation current command may be realized as two components relative to a d-q reference frame. The d-q frame of reference, in Cartesian coordinates, is synchronous with the rotation of the rotor within the motor 12. Thus $d_1$, $q_1$ represents a frame rotating at the fundamental electrical frequency $f_0$, referred to herein as the fundamental synchronous reference frame. The $d_n$, $q_n$ frame of reference represents a frame rotating at the first ripple harmonic $f_1$, referred to herein as the first harmonic synchronous reference frame. The $d_{c*n}$, $q_{c*n}$ frame of reference represents a frame rotating at the second ripple harmonic $f_2$, referred to herein as the second harmonic synchronous reference frame.

In step 104 of FIG. 3, the first cancellation current command block 34 (in the harmonic current cancellation module 24 in FIG. 2) determines a first cancellation current command for the first ripple harmonic first harmonic synchronous reference frame, based on the torque command 32 and predetermined torque characteristics of the motor 12, such as stator and rotor lamination geometry and the winding configuration.

Similarly, in step 106, the second cancellation current command block 38 of FIG. 2 determines a second cancellation current command for the second ripple harmonic in the second harmonic synchronous reference frame, based on the torque command 32 and predetermined torque characteristics of the motor 12.

The first and second cancellation current commands may be determined from a look-up table containing a plurality of stored current cancellation commands corresponding to a range or plurality of possible input torque commands. Alternatively, the cancellation current command block 38 may determine the cancellation current command by performing a polynomial curve fitting operation on the torque command.

A look-up table for one predetermined ripple harmonic (e.g. $f_1$=6) may be generated by commanding an input torque for the motor 12 and measuring the actual torque produced with a torque transducer. A fast Fourier transform is performed on the torque signal to obtain the magnitude of torque for the predetermined ripple harmonic. The commanded current is calibrated or tuned to be equal and opposite to the magnitude of torque for the predetermined ripple harmonic, thereby selectively cancelling the predetermined ripple harmonic. This process is repeated for a range of input torque commands to obtain a look-up table for the predetermined ripple harmonic. A similar process is carried out for the next predetermined ripple harmonic (e.g. $f_2$=12).

In step 108 of FIG. 3, the second cancellation current command block 38 of FIG. 2 projects the second cancellation current command (from step 106, in the second harmonic synchronous reference frame) onto the first cancellation current command (from step 104, in the first harmonic synchronous reference frame) through a transformation matrix 40, thereby generating a combined cancellation current command (in the first harmonic synchronous reference frame) at the first junction 36 (shown in FIG. 2).

The transformation matrix 40 may be determined by relating the frame axes for the first harmonic synchronous reference frame and the second harmonic reference frame. In the embodiment shown, the first ripple harmonic is the sixth harmonic and the second ripple harmonic is the twelfth harmonic. In this case, the relationship between the first and second harmonic synchronous reference frames, $q_6$, $d_6$ and $q_{12}$, $d_{12}$ respectively, is represented by a first matrix ($T_{H6}$) as shown in equation (1):

$$\begin{bmatrix} \tilde{q}_{12} \\ \tilde{d}_{12} \end{bmatrix} = [T_{H6}] \begin{bmatrix} \tilde{q}_6 \\ \tilde{d}_6 \end{bmatrix} \quad (1)$$

(Axes $q_6$, $d_6$ and $q_{12}$, $d_{12}$ are shown with a squiggly hat to represent vector coordinates Additionally, a first harmonic angle ($\theta_6$) defines the orientation of the first harmonic synchronous reference frame relative to a fundamental synchronous reference frame. A second harmonic angle ($\theta_{12}$) defines the orientation of the second harmonic synchronous reference frame relative to a fundamental synchronous reference frame, where $\theta_{12}=2\theta_6$. This leads to equations (2) and (3) below:

$$\tilde{q}_{12} = -\tilde{d}_6 \sin 2\theta_6 + \tilde{q}_6 \cos 2\theta_6 \quad (2)$$

$$\tilde{d}_{12} = \tilde{q}_6 \sin 2\theta_6 + \tilde{d}_6 \cos 2\theta_6 \quad (3)$$

Using the known relationships between $\sin 2\theta$, $\cos 2\theta$, $\sin \theta$ and $\cos \theta$, [see equation (4) below] leads to equation (5):

$$\sin 2\theta = 2\sin\theta\cos\theta \text{ and } \cos 2\theta = 1 - 2\sin^2\theta \quad (4)$$

$$\begin{bmatrix} \tilde{q}_{12} \\ \tilde{d}_{12} \end{bmatrix} = \begin{bmatrix} 1 - 2\sin^2\theta_6 & -2\sin\theta_6\cos\theta_6 \\ 2\sin\theta_6\cos\theta_6 & 1 - 2\sin^2\theta_6 \end{bmatrix} \begin{bmatrix} \tilde{q}_6 \\ \tilde{d}_6 \end{bmatrix} \quad (5)$$

The transformation matrix 40 is an inverse matrix of the first matrix ($T_{H6}$) since it projects the second ripple harmonic onto the first ripple harmonic. In this embodiment, the first matrix ($T_{H6}$) is defined in equation (6) below as follows:

$$T_{H6} = \begin{bmatrix} 1 - 2\sin^2\theta_6 & -2\sin\theta_6\cos\theta_6 \\ 2\sin\theta_6\cos\theta_6 & 1 - 2\sin^2\theta_6 \end{bmatrix}$$

Referring now to FIG. 3, in step 110, the controller 20 generates a ripple reduction signal (in response to the torque command 32) where the ripple reduction signal is at least partially based upon the combined cancellation current command.

As described below, FIG. 4 illustrates another example process 150 that may be implemented by the controller 20 to generate the ripple reduction signal based on the combined cancellation current command (determined in step 108). Referring now to FIG. 2, the harmonic current cancellation module 24 includes a high pass filter 42 that receives a predetermined current signal from a module 41 of the controller 20, based on the torque command 32. The module 41 may be a fundamental frequency decoupling block that measures current in the fundamental synchronous reference frame. The high pass filter 42 blocks out the DC component of the fundamental frequency component of the current, that is, eliminates the fundamental frequency components and allows only higher frequency harmonics above the frequency of the high pass filter 42 to pass through unattenuated.

In step 151 of FIG. 4, a filtered current signal in a fundamental synchronous reference frame is generated by the high pass filter 42 (shown in FIG. 2). In step 152 of FIG. 4, the filtered current signal is transformed from the fundamental synchronous reference frame to the first harmonic synchronous reference frame by the third reference frame transformation block 44 (shown in FIG. 2).

In step 154 of FIG. 4, the filtered current signal in the first harmonic synchronous frame may be added to the combined current cancellation current at the second junction 46 (shown in FIG. 2). Referring to FIG. 2, the output of the second junction 46 is fed into the second current regulator 25.

In step 156 of FIG. 4, a second commanded voltage (based on the combined cancellation current command) is generated by the second current regulator 25. In step 158 of FIG. 4, the second commanded voltage (step 156) is transformed by the fourth reference frame transformation block 50 (see FIG. 2) from the first harmonic synchronous reference frame to the fundamental synchronous reference frame. The output of the fourth reference frame transformation block 50 is fed into the voltage summation junction 26 (shown in FIGS. 1-2, see step 160 below).

In step 157 of FIG. 4, a first commanded voltage in a fundamental synchronous reference frame is generated by the first current regulator 22. The first current regulator 22 generates the first commanded voltage based on a synchronous stator current command (which may be received from another module within the controller 20) to operate the motor 12 with the commanded torque 32. The synchronous stator current command is based on the torque command 32, the energy source voltage, the angular velocity of the motor and other operating parameters of the electric motor system 10. The first current regulator 22 provides the first commanded voltage to the voltage summation junction 26 (shown in FIGS. 1-2, see step 160 below).

In step 159 of FIG. 4, the first commanded voltage may be adjusted based at least partially on a feedback loop 31 (shown in FIG. 1), which provides measured current feedback from the motor 12. Referring to FIG. 1, the measured current feedback is processed by the second reference frame transformation block 28B (from a stationary reference frame to a fundamental synchronous reference frame) and the second phase transformation block 30B (to change from a three-phase state to a two-phase state).

In step 160 of FIG. 4, a third commanded voltage is generated by adding the first commanded voltage and the second commanded voltage at the voltage summation junction 26 (see FIG. 1). At this stage, the third commanded voltage may be in a three phase state in the fundamental synchronous reference frame.

In step 162 of FIG. 4, the third commanded voltage may be transformed from the fundamental synchronous reference frame to the stationary reference frame by the first reference frame transformation block 28A (see FIG. 1). The first reference frame transformation block 28A may use rotor position (e.g., from the resolver system 18 described above) to transform the third commanded voltage from the synchronous reference frame to the stationary reference frame, in accordance with conventional coordinate transformation.

In step 164 of FIG. 4, the third commanded voltage may be transformed from a two-phase state to a three-phase state by the first phase transformation block 30A (see FIG. 1). The first phase transformation block 30A adjusts the third commanded voltage to the equivalent three-phase signals, as known to those skilled in the art. The third commanded voltage in the three-phase stationary frame may be the operational control signal or ripple reduction signal passed to the inverter 14, which processes the voltage commands and applies the commanded voltages to stator windings of the motor 12. In other words, the ripple reduction signal is based upon the third commanded voltage.

In summary, a system and method is provided for generating a ripple reduction signal that simultaneously cancels the first and second ripple harmonics. The second ripple harmonic may be canceled with the first ripple harmonic by being projected onto the first ripple harmonic through the transformation matrix 40. This approach saves processor throughput and may be useful in sensorless motor control applications where it may not be ideal to project harmonic components on a fundamental synchronous reference frame. This approach may be useful in an application where a fundamental current controller bandwidth is much lower than a harmonic current controller bandwidth.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ a Structured Query Language (SQL) in addition to a language for creating, storing, editing, and executing stored procedures.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electric motor system comprising:
a motor configured to produce a torque signal in response to a torque command, the torque signal having a fundamental frequency component, a first ripple harmonic and a second ripple harmonic;
wherein the first ripple harmonic is an integer multiple of the fundamental frequency component and the second ripple harmonic is an integer multiple of the first ripple harmonic;
a controller operatively connected to the motor and configured to generate a first and a second cancellation command to cancel the first and the second ripple harmonic, respectively;
wherein the controller is configured to project the second cancellation command onto the first cancellation command through a transformation matrix to thereby generate a combined cancellation command to simultaneously cancel the first and the second ripple harmonic in the torque signal;
wherein the transformation matrix is dependent on a first harmonic angle ($\theta_6$), the first harmonic angle ($\theta_6$) defining an orientation of a first harmonic synchronous reference frame relative to a fundamental synchronous reference frame;
wherein the transformation matrix is an inverse matrix of a first matrix ($T_{H6}$); the first matrix ($T_{H6}$) being defined as:

$$T_{H6} = \begin{bmatrix} 1 - 2\sin^2\theta_6 & -2\sin\theta_6\cos\theta_6 \\ 2\sin\theta_6\cos\theta_6 & 1 - 2\sin^2\theta_6 \end{bmatrix};$$

and
wherein the controller is configured to generate a ripple reduction signal in response to the torque command, the ripple reduction signal being dependent upon the combined cancellation command and predetermined characteristics of the motor.

2. The system of claim 1:
wherein the first ripple harmonic is a sixth harmonic frequency and the second ripple harmonic is a twelfth harmonic frequency.

3. The system of claim 1, wherein the controller includes: a first current regulator configured to control a fundamental current in a fundamental synchronous reference frame.

4. The system of claim 1, wherein the controller includes: a first phase transformation block configured to transform the ripple reduction signal from a two-phase state to a three-phase state.

5. The system of claim 1, wherein the controller includes: a reference frame transformation block configured to transform the ripple reduction signal from a fundamental synchronous reference frame to a stationary reference frame.

6. A method for reducing torque ripple in an electric motor system having a motor, the method comprising:
generating a torque command, wherein the motor is configured to produce a torque signal in response to the torque command, the torque signal having a fundamental frequency component, a first ripple harmonic and a second ripple harmonic;
wherein the first ripple harmonic is an integer multiple of the fundamental frequency component and the second ripple harmonic is an integer multiple of the first ripple harmonic;
determining a first cancellation current command based on the first ripple harmonic in a first harmonic synchronous reference frame;
determining a second cancellation current command based the second ripple harmonic in a second harmonic synchronous reference frame;
generating a combined cancellation current command by projecting the second cancellation current command onto the first cancellation current command through a transformation matrix, the combined cancellation current command being in the first harmonic synchronous reference frame;
generating a ripple reduction signal in response to the torque command, wherein the ripple reduction signal is based upon the combined cancellation current command and predetermined characteristics of the motor;
wherein the first ripple harmonic is a sixth harmonic frequency and the second ripple harmonic is a twelfth harmonic frequency;
wherein the transformation matrix is dependent on a first harmonic angle ($\theta_6$), the first harmonic angle ($\theta_6$) defining an orientation of the first harmonic synchronous reference frame relative to a fundamental synchronous reference frame; and
wherein the transformation matrix is an inverse matrix of a first matrix ($T_{H6}$); the first matrix ($T_{H6}$) being defined as:

$$T_{H6} = \begin{bmatrix} 1-2\sin^2\theta_6 & -2\sin\theta_6\cos\theta_6 \\ 2\sin\theta_6\cos\theta_6 & 1-2\sin^2\theta_6 \end{bmatrix}.$$

7. The method of claim 6, wherein determining the first cancellation current command based on the first ripple harmonic includes:
obtaining the first cancellation current command from a lookup table;
wherein the lookup table includes a plurality of cancellation commands based on characteristics of the motor, the plurality of cancellation commands corresponding to a plurality of possible torque commands.

8. The method of claim 6, wherein determining the second cancellation current command based on the second ripple harmonic includes:
obtaining the second cancellation current command from a lookup table;
wherein the lookup table includes a plurality of cancellation commands based on characteristics of the motor, the plurality of cancellation commands corresponding to a plurality of possible torque commands.

9. The method of claim 6, further comprising:
generating a first commanded voltage in a fundamental synchronous reference frame through a first current regulator.

10. The method of claim 9, further comprising:
adjusting the first commanded voltage based on a feedback loop providing measured current feedback from the motor.

11. The method of claim 9, further comprising:
generating a second commanded voltage based on the combined cancellation current command through a second current regulator;
transforming the second commanded voltage from a first harmonic synchronous reference frame to the fundamental synchronous reference frame;
generating a third commanded voltage by adding the first commanded voltage and the second commanded voltage in a voltage summation junction; and
wherein the ripple reduction signal is dependent upon the third commanded voltage.

12. The method of claim 11, further comprising prior to generating a second commanded voltage:
generating a filtered current signal in the fundamental synchronous reference frame through a high pass filter;
transforming the filtered current signal from the fundamental synchronous reference frame to the first harmonic synchronous reference frame; and
adding the filtered current signal in the first harmonic synchronous frame to the combined current cancellation current command.

13. The method of claim 11, further comprising:
transforming the third commanded voltage from a two-phase state to a three-phase state.

14. The method of claim 11, further comprising:
transforming the third commanded voltage from the fundamental synchronous reference frame to a stationary reference frame.

15. A method for reducing torque ripple in an electric motor system having a motor, the method comprising:
generating a torque command, wherein the motor is configured to produce a torque signal in response to the torque command, the torque signal having a fundamental frequency component, a first ripple harmonic and a second ripple harmonic;
wherein the first ripple harmonic is an integer multiple of the fundamental frequency component and the second ripple harmonic is an integer multiple of the first ripple harmonic;
determining a first cancellation current command based on the first ripple harmonic in a first harmonic synchronous reference frame;
determining a second cancellation current command based a second ripple harmonic in a second harmonic synchronous reference frame;

generating a combined cancellation current command by projecting the second cancellation current command onto the first cancellation current command through a transformation matrix, the combined cancellation current command being in the first harmonic synchronous reference frame;

generating a first commanded voltage in a fundamental synchronous reference frame through a first current regulator;

adjusting the first commanded voltage based at least partially on a feedback loop providing measured current feedback from the motor;

generating a second commanded voltage based on the combined cancellation current command through a second current regulator;

transforming the second commanded voltage from a first harmonic synchronous reference frame to the fundamental synchronous reference frame;

generating a third commanded voltage by adding the first commanded voltage and the second commanded voltage in a voltage summation junction; and generating a ripple reduction signal in response to the torque command, wherein the ripple reduction signal is dependent upon the third commanded voltage.

* * * * *